United States Patent
Takahashi

(10) Patent No.: US 6,179,409 B1
(45) Date of Patent: Jan. 30, 2001

(54) COLOR PRINTING APPARATUS AND COLOR PRINT DATA ANALYZING METHOD

(75) Inventor: Mitsuru Takahashi, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/435,194

(22) Filed: Nov. 8, 1999

(30) Foreign Application Priority Data

Nov. 9, 1998 (JP) .................................................. 10-318093

(51) Int. Cl.[7] ................................ B41J 2/21; B41J 2/145; B41J 2/15; H04N 1/40

(52) U.S. Cl. ................................ 347/43; 347/40; 358/448

(58) Field of Search ........................ 347/43, 40; 358/448, 358/1.16

(56) References Cited

U.S. PATENT DOCUMENTS 5,323,488 * 6/1994 Udagawa .............................. 358/448

FOREIGN PATENT DOCUMENTS 6-139033    5/1994  (JP) .

* cited by examiner

Primary Examiner—Thinh Nguyen
(74) Attorney, Agent, or Firm—Ostrolenk, Faber, Gerb & Soffen, LLP

(57) ABSTRACT

A color print apparatus in which a color analysis processing device is being given a process priority in a multiple color system and proceeds to shift the execution priority to the next color according to a predetermined color order in timing with the completion of continuous analysis of a predetermined data amount of the color print data less than one page.

18 Claims, 6 Drawing Sheets

COLOR PRINTING APPARATUS AND COLOR PRINT DATA ANALYZING METHOD

BACKGROUND OF THE INVENTION

1. Field of the Invention

The present invention relates to a color printing apparatus and a color print data analyzing method, and more particularly to a color printing apparatus and a color print data analyzing method for executing a command analyzing process with respect to color print data received from a host device to generate page data for each color component and performing printing by superimposing images for respective color components for printing based on the generated page data.

2. Description of the Related Art

As disclosed in, for example, Japanese patent laid-open publication No. Hei6-139033, in this kind of conventional color printing apparatus, a definition for converting a color description into a monochrome description having only a monochrome value for each elementary color is added in a definition addition section of a page description language program including color descriptions according to a predetermined color specifying system using predetermined multiple elementary colors, the page description language program having this definition added thereto is analyzed by a monochrome color interpreter to be developed to monochrome image data, and the monochrome image data is further synthesized and outputted as color output data.

In the conventional color printing apparatus, however, all the data must be first generated for, e.g., cyan, which is sequentially followed by generation of all the data for magenta, yellow and black. The data must be, therefore, held in a receiving memory until generation of the color image data is completed, resulting in a problem of improvement in efficient use of the memory. Further, the color description in the program must be retrieved in the definition addition section to generate a program converted into the monochrome description before analyzing the page description language program for each of multiple elementary colors by the monochrome interpreter, and the high-speed color printing is hence difficult.

SUMMARY OF THE INVENTION

It is therefore an object of the present invention to provide a color printing apparatus and a color print data analyzing method which improve the efficient use of the memory by adopting the multithread system and enable the high-speed color printing, the color printing apparatus being structurally simple to be mounted on a printer firmware.

To achieve this aim, a color printing apparatus according to one aspect of the present invention comprises: receiving means for receiving color print data for printing a color image by superimposing images for multiple color components; color analysis processing means for analyzing the color print data for previously specified one of the multiple color, a number of the means being equal to a number of the color components; data distributing means for distributing the color print data to the multiple color analysis processing means; analysis controlling means for giving an execution right to analyze print data to one of the multiple color analysis processing means upon accepting distribution of the print data from the data distributing means and shifting the execution right to the next color analysis processing means in a predetermined order in timing with completion of continuous analysis of a predetermined amount of color print data less than one page; drawing means for generating drawing data for multiple color components respectively based on results of analysis of the multiple color components; a plurality of frame buffers for respectively storing the drawing data for the multiple color components; and printing means for superimposing images for multiple color components based on the drawing data for the multiple color components for printing.

This color printing apparatus shifts the execution right to the next color analysis processing means in timing with completion of continuous analysis of a predetermined amount of color print data less than one page. It is therefore unnecessary to accumulate data corresponding to one page in the receiving memory, and the processed data can be eliminated, thereby efficiently using the memory. Otherwise, a capacity of the receiving memory can be reduced.

Moreover, in the above color printing apparatus, the analysis controlling means may have means for producing a predetermined number of color analyzing means.

According to this color printing apparatus, increase or decrease in a number of color analyzing means can be facilitated. For example, in case of a color printing apparatus having a seven-color printing mechanism for printing light components for respective colors except black, this can be realized by generating seven color analysis processing means and changing only the setting of the order of rotation and the data amount for switching data in each color analysis processing.

According to another aspect of the invention, a color printing apparatus comprises: receiving means for receiving color print data for printing a color image by superimposing images for multiple color components; a plurality of data processing means having at least one of color analysis processing means for analyzing the color print data for previously specified one of the multiple color components, a number of the color analysis processing means being equal to a number of the color components; receiving memory distributing means for distributing the color print data to a plurality of the color analysis processing means; a plurality of analysis controlling means for giving an execution right to analyze print data to one of the color analysis processing means independently included in the respective data processing means upon accepting distribution of the print data from the data distributing means; a plurality of drawing means for generating drawing data respectively based on results of analysis by the color analysis processing means independently included in the respective data processing means; a plurality of frame buffers for respectively storing the multiple drawing data; and printing means for superimposing images for the multiple color components respectively based on the multiple drawing data for printing.

This color printing apparatus is provided with a plurality of data processing means having at least one of a plurality of color analysis processing means each of which analyzes color print data for one of the multiple color components, and has a plurality of analysis controlling means for giving an execution right to analyze print data to one of the color analysis processing means independently included in the respective data processing means. Each data processing means can therefore partially take charge of the color analysis processing means to independently perform data analysis, and all the color components can be analyzed at high speed.

Additionally, in the above color printing apparatus, the analysis controlling means may have means for generating a predetermined number of color analyzing means in each data processing means.

According to this color printing apparatus, when the two data processing means take partially charge of the twocolor print data analysis processing by using the color analysis processing means for four colors, a number of the color analysis processing means and colors assigned to these means in each data processing means can be set, and the processing burden of each data processing means can be equal.

DETAILED DESCRIPTION OF THE PREFERRED EMBODIMENTS

Figure 1:
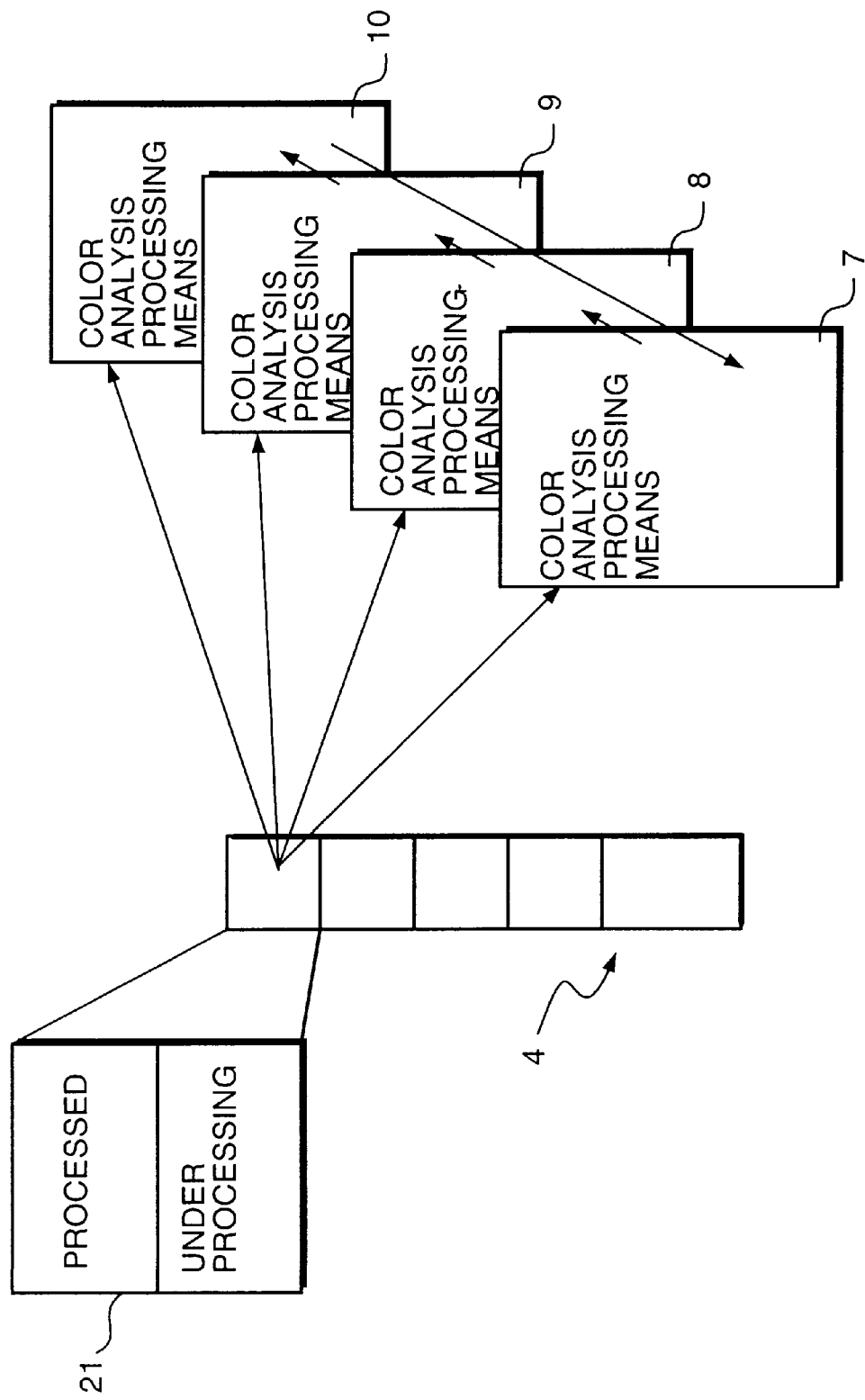
FIG. 1 is a view for explaining the general operation of a preferred embodiment according to the present invention.

The structure of a color printing apparatus according to one preferred embodiment of the present invention will now be described with reference to the accompanying drawings. FIG. 1 is a view showing the general operation of one embodiment according to the present invention. This color printing apparatus is a printer having a four printing mechanisms for respectively printing images for multiple color components, e.g., color components of CMYK (cyan, magenta, yellow and black). This color printing apparatus has four color analysis processing means each of which performs the command analysis processing on print data received from a host device to generate page data for each color associated with each printing mechanism, and the apparatus carries out the multithread control on the command analysis processing performed in the color analysis processing means thereof.

As shown in FIG. 1, the print data received from the host device and stored in a receiving memory 4 is divided into blocks and the same part of the print data in a block 21 is sequentially transmitted to the color analysis processing means 7 to 10. Further, the color printing apparatus creates a page data for each color by performing the multithread control by which the command analysis processing on the same print data is carried out in each color analysis processing means is sequentially switched in a predetermined order. That is, the command analysis processing executed in each color analysis processing means corresponds to each thread to be subjected to the multithread control. The timing for rotation of each thread depends on an amount of the print data processed by each thread. For example, a color analysis processing section 7 for generating page data for cyan from the print data executes the 1-Kbyte command analysis processing on the print data at first. Subsequently, a color analysis processing section 8 for generating a page data for magenta from the print data is endowed with the right to execute the processing. The color analysis processing means 8 carries out the 1-Kbyte processing on the color print data which is the same with the print data processed in the color analysis processing section 7. Then, a color analysis processing section 9 for generating a page data for yellow from the print data is endowed with the right to execute the processing.

The color analysis processing section 9 executes the 1-Kbyte processing on the print data which is the same with the print data processed in the color analysis processing sections 7 and 8. At last, a color analysis processing section 10 for generating page data for black from the print data is endowed with the right to execute the processing. When the color analysis processing section 10 completes the processing of the 1-Kbyte print data which is equal to those processed in the color analysis processing sections 7, 8 and 9, the color analysis processing section 7 is then endowed with the right to execute the processing and processes the new 1-Kbyte print data. The command analysis processing continues until the processing for generating the page data for each of all colors from the print data is completed for each block by a flow of the sequential processing.

In this manner, the page data for all the color components has been created and processed to a halfway point of the block 21 of the print data currently under the command analysis processing, and this part of the print data can be discarded.

Figure 2:
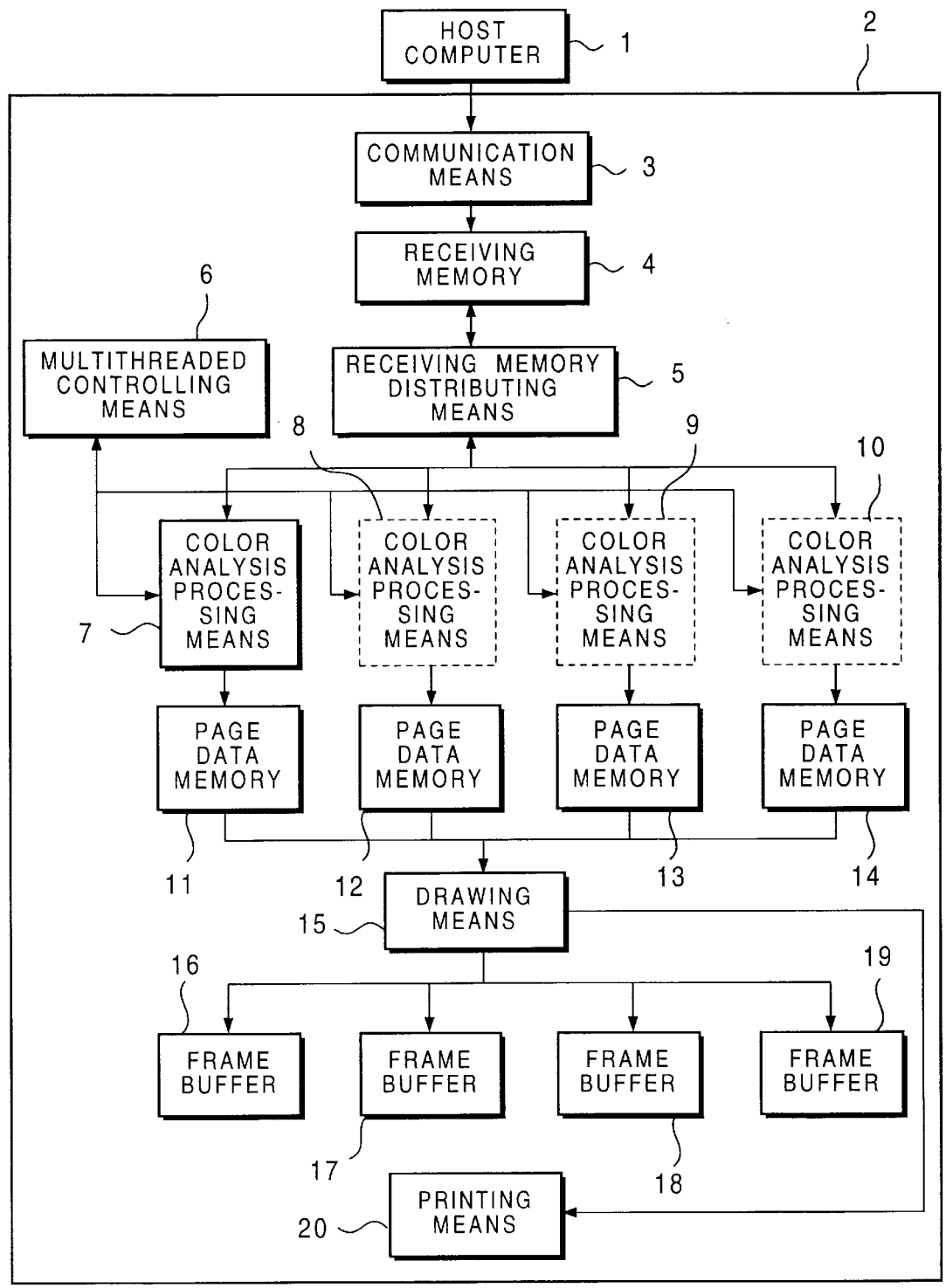
FIG. 2 is a block diagram showing the structure of the preferred embodiment according to the present invention.

FIG. 2 is a block diagram showing the structure of the embodiment according to the present invention. In this drawing, the color printing apparatus 2 receives the print data transmitted from a host computer 1.

The color printing apparatus 2 comprises: communication means 3 for communicating with the host computer 1; a receiving memory 4 for storing print data received from the communication means 3; receiving memory distributing means 5 for distributing the print data stored in the receiving memory 4 to be multithread-processed; multithread controlling means 6 for performing the multithread control over multiple command analysis processes for generating monochrome page data for each color component as each thread; color analysis processing means 7 to 10 for respectively carrying out the command analysis processing to be multithread-controlled as each thread; page data memories 11 to 14 for respectively storing page data generated by the color analysis processing means 7 to 10; drawing means 15 for drawing based on the page data for each color component stored in the page data memories 11 to 14; frame buffers 16 to 19 for respectively storing frame buffer data for each color component generated by the drawing means 15: and printing means 20 having four printing mechanisms for respectively printing an image for each color component based on the frame buffer data for each color component stored in the frame buffers 16 to 19.

The above-mentioned means generally operate as follows. Although the communication means 3 is means for establishing communication between the host computer 1 and the color printing apparatus 2, the host computer 1 is means for transmitting the print data whilst the color printing means 2 is receiving means in this example particularly. When the host computer 1 transmits the print data, the color printing apparatus 2 stores the print data in the receiving memory 4.

The receiving memory distributing means 5 distributes the content of the receiving memory, i.e., the print data to each thread to be subject to the multithread control, namely, four command analysis processes. In other words, the print data stored in the receiving memory is distributed to the color analysis processing means 7 to 10. Specifically, pointers whose number is equal to that of threads to be multithread-controlled are set at positions in the receiving memory from which the data is distributed to each thread. As a result, tasks which are targets of the threads can be independently executed when performing the multithread processing with respect to one receiving memory without carrying out an exclusive processing or the like on the data.

In addition, the received print data is divided into blocks every one page in advance, and they are analyzed in the color analysis processing means 7 to 10. When the analysis proceeds and the analysis of the print data for one page is completed, the next block becomes a target of the print data distribution.

The multithread controlling means 6 generates the color analysis processing means 7 to 10 which are tasks to be multithread-controlled, and controls rotation of the execution right with which the color analysis processing means performs the command analysis processing for each color component.

The color analysis processing means 7 to 10 respectively carry out: the command analysis processing which is subjected to the multithread control; analysis of the print data distributed by the receiving memory distributing means 5; creation of the page data for each color component; storage of the obtained result in the page memories 11 to 14. When analysis of the data is completed for a given capacity in the color analysis processing means 7 to 10, the multithread controlling means 6 shifts the right for executing the command analysis processing to the next color analysis processing means.

The drawing means 15 uses the page data for each color component generated in each of the color analysis processing means 7 to 10 to produce the drawing data for each color component. The printing means 20 superimposes and print images for respective color components based on the drawing data for respective color components.

Figure 3:
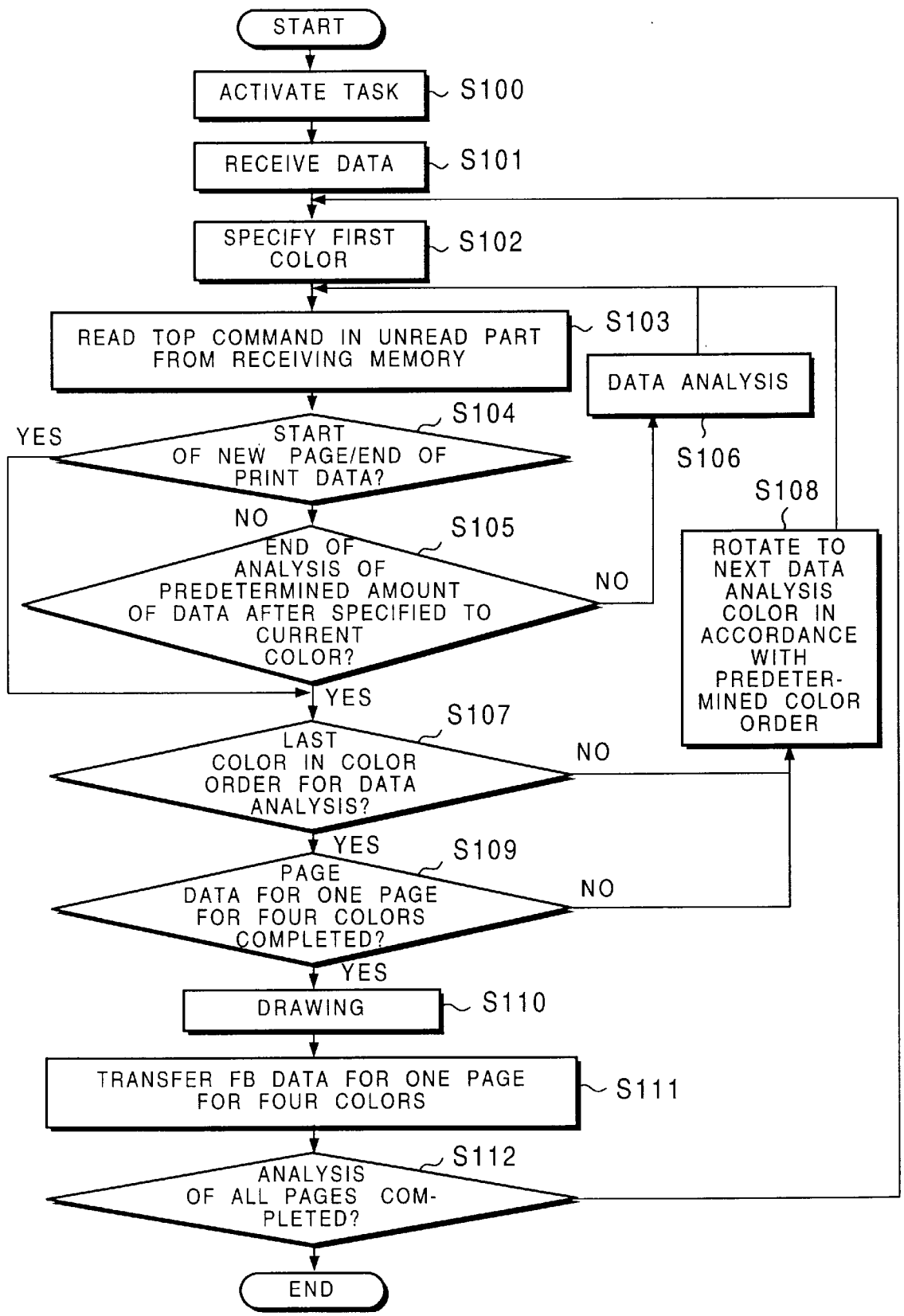
FIG. 3 is a flowchart showing print data analysis and drawing and printing operation illustrated in FIG. 2.

The detailed description will now be given to analysis of the print data and the drawing and printing operation according to this embodiment with reference to the flowchart of FIG. 3. At first, when the color printing apparatus 2 is started up, the multithread controlling means 6 is activated by generating the color analysis processing means 7 to 10 (step S100). At this time, the multithread controlling means 6 assigns a color of which each color analysis processing means takes charge to each of the color analysis processing means 7 to 10. In this example, any of cyan, magenta, yellow and black is assigned.

Thereafter, each of the color analysis processing means 7 to 10 analyzes the print data for the assigned color to generate the page data. The assigned color is not changed until the task of the color analysis processing is extinguished. Subsequently, the communication means 3 receives the print data from the host computer 1 and stores it in the receiving memory 4 (step S101), and the receiving memory distributing means 5 sets a pointer indicative of a position from which distribution is effected to each of the color analysis processing means 7 to 10. The multithread controlling means 6 then specifies the first color analysis processing means 7 and gives the right to execute the analysis processing to this means. The color analysis processing means which is endowed with the right to execute the analysis processing requests transmission of a command from the receiving memory distributing means 5, and the receiving memory distributing means 5 transmits from the receiving memory 4 a top command in a part which is yet to be read and associated with the color analysis processing means that has requested the command transmission (step S103). The color analysis processing means then reads the transmitted command, accumulates an amount of data of the thus-read command and judges on whether the content of the transmitted command corresponds to a line feed or an end of the print data (step S104). If the command does not indicate a line feed or an end of the print data, the color analysis processing means then refers to the accumulated amount of the data of the commands which were read after endowed with the execution right, and makes a judgment upon whether analysis of a predetermined amount of the print data, e.g., the 1-Kbyte print data is completed (step S105). If the predetermined amount is not satisfied yet, the color analysis processing means analyzes the command (step S106), returns to the step S103 and requests the next command to be read from the receiving memory distributing means 5.

It is to be noted that the color print data includes a color component setting command for defining the density of each color component of characters or figures to be printed and another command which is used for defining shapes of characters or figures to be printed and does not have the color component information premising the color component set by the color component setting command for colors of characters or figures. In analysis of a command, if a read command is the color component setting command, the color analysis processing means identifies and holds the density level of the color component which is a target of analysis defined by the color component setting command, and if the read command is the command having no color component information, the color analysis processing means analyzes the command by making reference to the identified and held density level of the color component, which is a target of analysis, from the color component setting commands read before the current command.

Incidentally, when analysis of a predetermined amount of the print data is terminated in the step S105, the color analysis processing means endowed with the right to execute the analysis informs the multithread controlling means 6 of completion of analysis of a predetermined amount of the print data. The multithread controlling means 6 judges on whether the color analysis processing means that has made notification is the last color analysis processing means (step S107). If it is not the last color analysis processing means, the multithread controlling means 6 rotates the right to execute analysis to the next color analysis processing means in accordance with a predetermined color order (step S108), and the control returns to the step S103. In other words, the outline of color analysis processing S99 constitutes each thread which is subjected to multithread control, and the processing execution right is shifted to a different thread by rotation.

The order of rotation is determined in advance, and the execution right is shifted to the color analysis processing means 7, the color analysis processing means 8, the color analysis processing means 9 and the color analysis processing means 10 in the mentioned order. Additionally, the execution right is rotated from the last color analysis processing means 10 to the first color analysis processing means 7.

Further, if the content of the transmitted command is a line feed or an end of the print data in the step S104, the color analysis processing means having the right to execute the analysis processing informs the multithread controlling means 6 of completion of analysis of the print data for the assigned color, the control jumps to the step S107, and the multithread controlling means 6 makes a judgment upon whether the color analysis processing means that has made notification is the last color analysis processing means (step S107).

If it is the last color analysis processing means in the step S107, check is made upon whether all the color analysis processing means have informed that the content of the command was a line feed or an end of the print data, and a judgment is further made upon whether the page data corresponding to one page is completed for four colors (step S109).

If the page data is not completed for four colors, the right to execute the analysis processing is shifted to the next color analysis processing means in accordance with a predetermined color order (step S108), and the control returns to the step S108.

In the step S108, the drawing means 15 performs drawing based on the created page data when decided that the page data for four colors is completed, and the frame buffer data for each color component is generated and stored in each of the frame buffers 16, 17, 18 and 19 (step S110). Subsequently, a judgment is made upon whether the frame buffer data for four color is completed and, if the data for four color is completed, the frame buffer data corresponding to one page for four colors is transferred to the printing means 20(step S111). The printing means 20 superimposes images for four colors to print based on the transferred frame buffer data for four colors. Then judge is made on whether analysis and drawing of all pages of the received print data are finished (step S112). That is, check is made on whether the end of the print data is received from all the color analysis processing means and, if the end of the print data is received from all the color analysis processing means, it is decided that analysis of all pages of the received print data is completed. In any other case, it is decided that analysis is not completed. If analysis of all pages is not terminated, the content notified by the color analysis processing means is cleared, and the control returns to the step S102. When it is decided that analysis and drawing of all pages are completed, the processing is finished.

Figure 4:
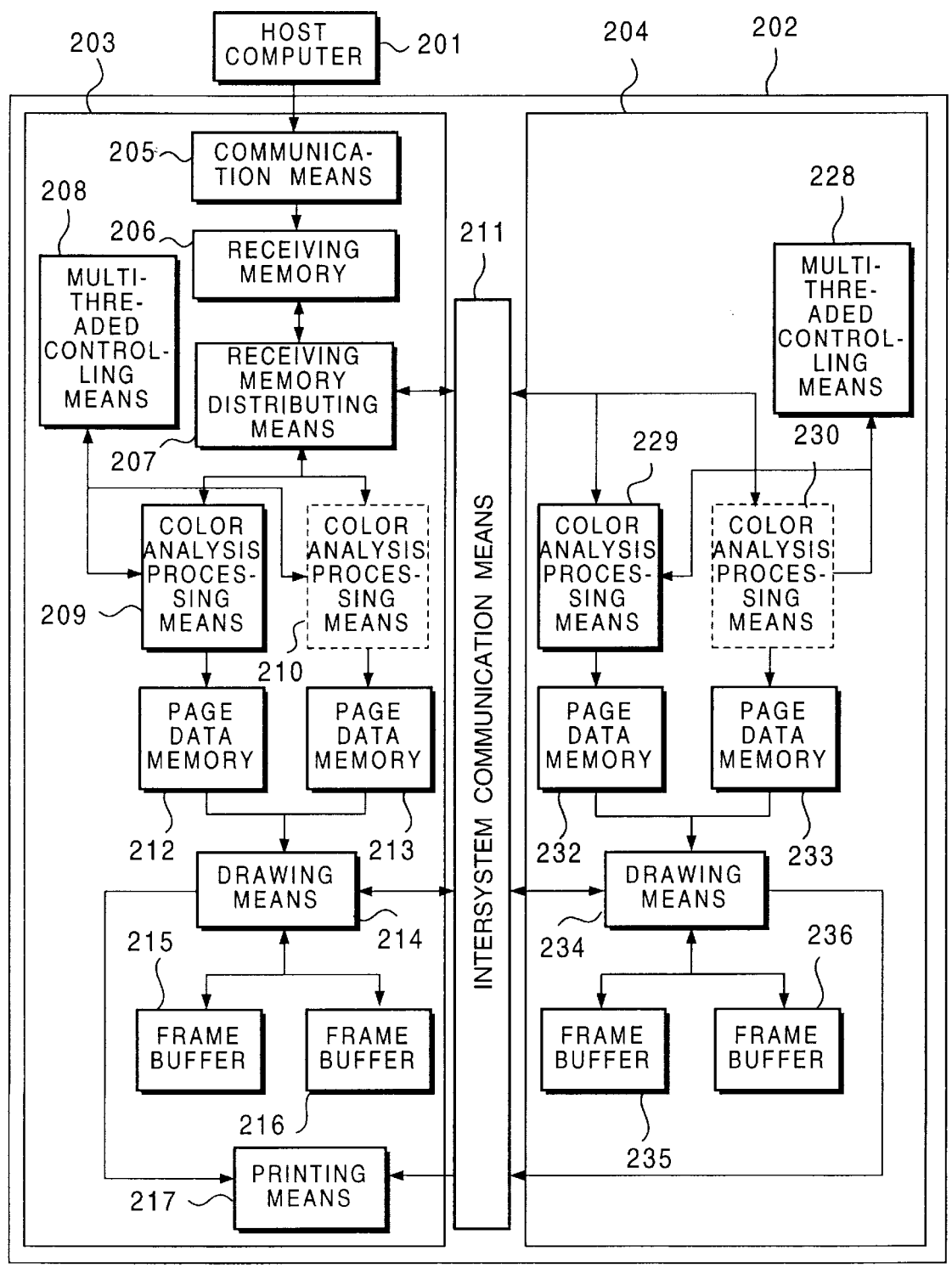
FIG. 4A is a block diagram showing the structure of another embodiment according to the present invention.

Another preferred embodiment according to the present invention will now be described with reference to the drawings. FIG. 4 is a block diagram showing the structure of another embodiment.

In this embodiment, a color printing apparatus 202 is constituted by data processing means 203 and 204. The data processing means 203 includes: communication means 205 for receiving print data from a host computer 201; a receiving memory 206 for storing the received print data; a receiving memory distributing means 207 for distributing the print data stored in the receiving memory 206 to each color analysis processing; color analyzing means 209 and 210 for analyzing the print data for a color assigned by the receiving memory distributing means to generate page data; intersystem communication means 211 for transmitting/receiving data to/from the data processing means 204; and printing means 217 for performing printing based on the frame buffer data.

The intersystem communication means 211 distributes the print data from the host computer 210, synchronizes the frame buffer generated by drawing means 214 and drawing means 234 with collection of the frame buffer data to the printing means 217, and establishes communication between the data processing means 203 and the data processing means 204. That is, the intersystem communication means 211 synchronizes with the receiving memory distributing means 207 to distribute the print data to color analysis processing means of the data processing means 203 and the counterpart of the data processing means 204, further synchronizes the frame buffer data generated by the drawing means of the data processing means 203 with that generated by the drawing means of the data processing means 204 and collects the data to be transmitted to the printing means.

Figure 5:
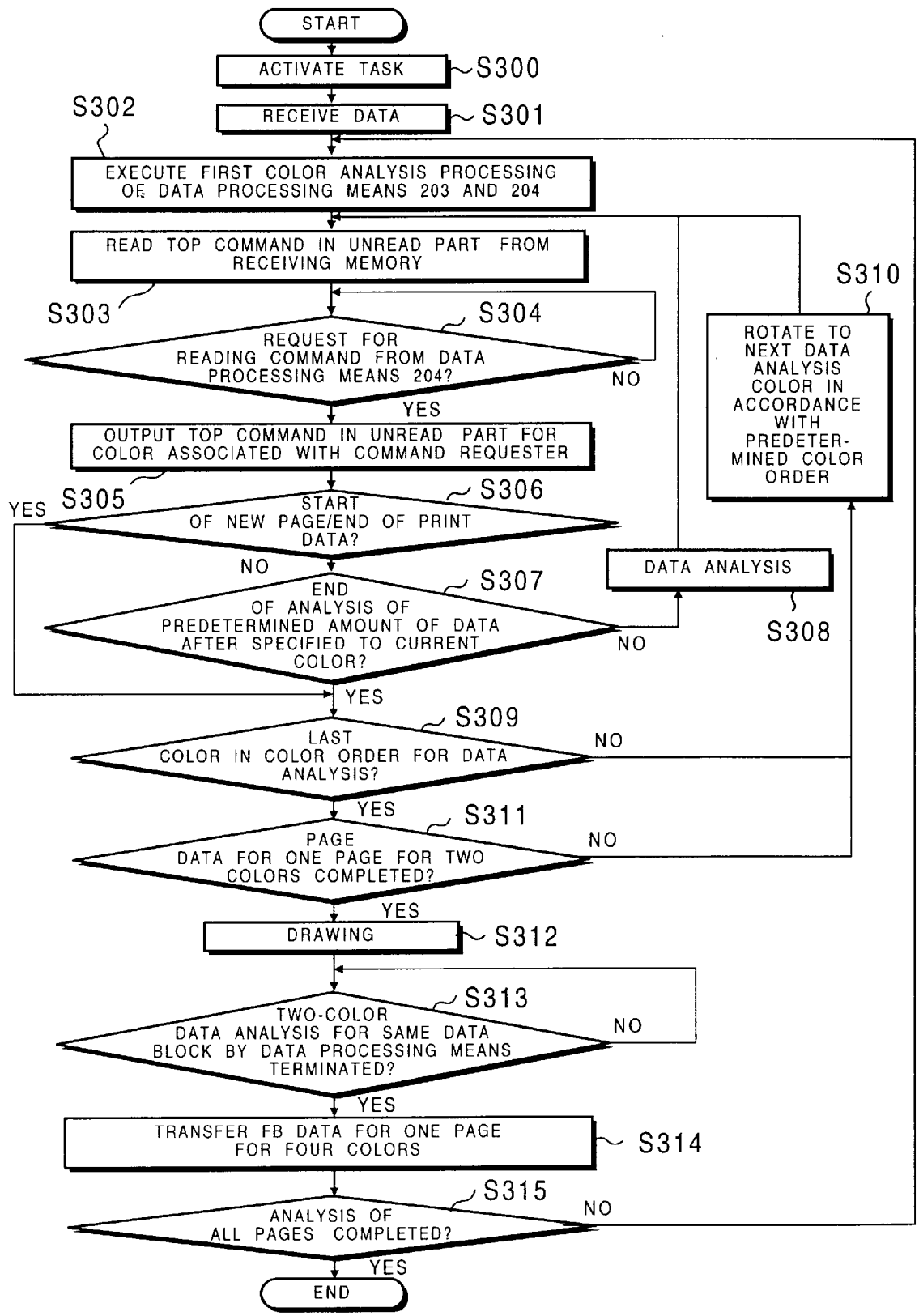
FIG. 5 is a flowchart showing print data analysis and drawing and printing operation of data processing means 203 illustrated in FIG. 4.
Figure 6:
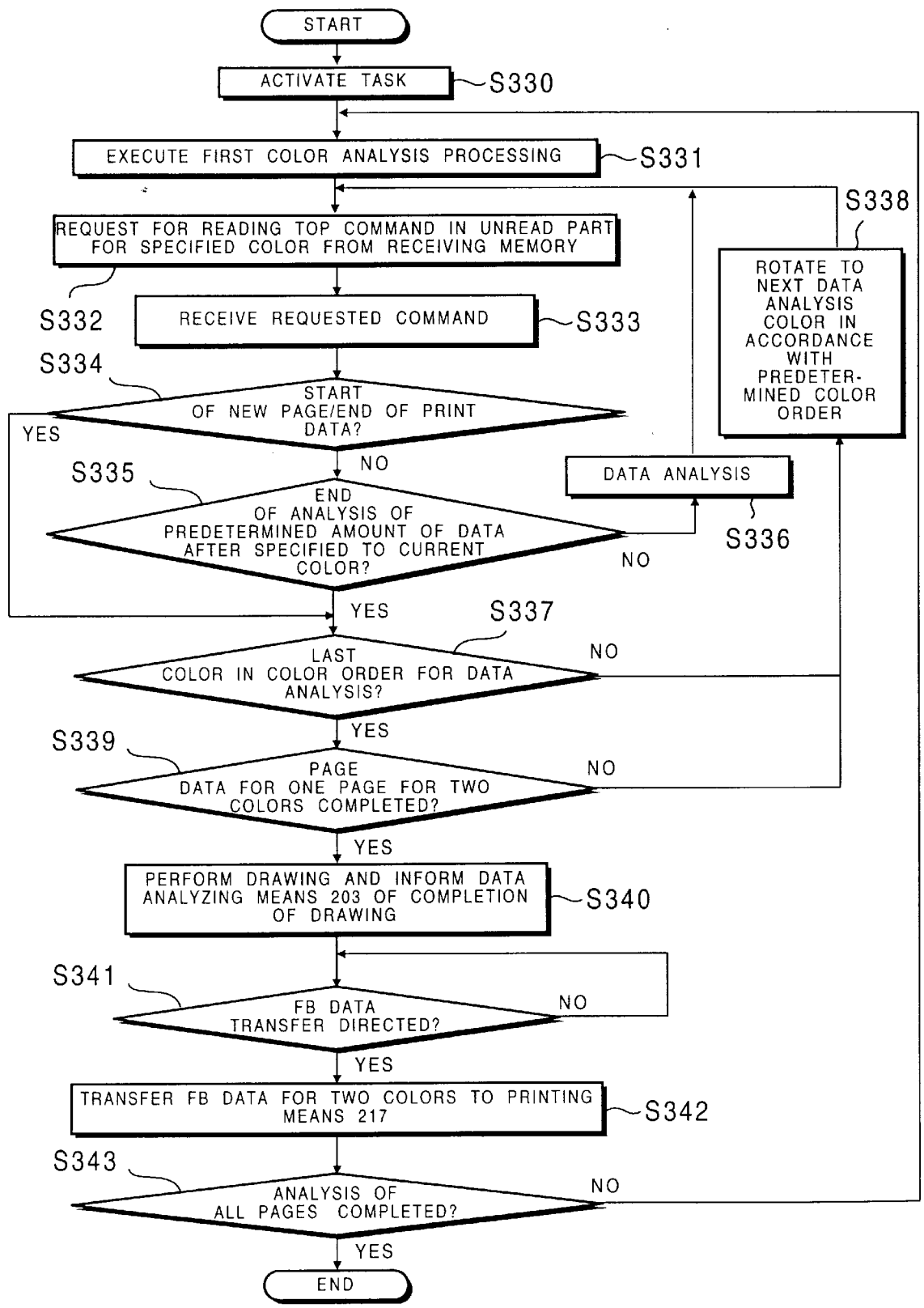
FIG. 6 is a flowchart showing print data analysis and drawing and printing operation of data processing means 204 illustrated in FIG. 4.

The operation in this embodiment according to the present invention will now be described. FIG. 5 is a flowchart showing analysis of the print data by the data processing means 203 and the drawing and printing operation according to this embodiment of the present invention. FIG. 6 is a flowchart showing analysis of the print data by the data processing means 204 and the drawing and printing operation according to this embodiment of the present invention.

Firstly, in the step S300, when the color printing apparatus 202 is started up, the multithread controlling means 208 sequentially activates the color analysis processing means 209 and 210. Similarly, in the step S330, when the color printing apparatus 202 is started up, the multithread controlling means 228 sequentially activates the color analysis processing means 229 and 230. Here, the multithread controlling means 208 decides and assigns colors of which the color analysis processing means 209 and 210 included in the data processing means 203 take charge. Similarly, the multithread controlling means 228 decides and assigns colors of which the color analysis processing means 229 and 230 included in the data processing means 204 take charge. The color assigned to each color analysis processing is any of cyan, magenta, yellow and black, as similar to the foregoing embodiment. Each color analysis processing thereafter creates the page data having the data of the assigned color. The assigned color is not changed until the task of the color analysis processing is extinguished.

Upon receiving the print data from the host computer 1, the communication means 3 stores it in the receiving memory 4 (step S301). The receiving memory distributing means 207 sets four pointers used for distributing the stored print data to the respective color analysis processing means 209, 210, 229 and 230, and the multithread controlling means 208 specifies the first color analysis processing means 209 and gives it the right to execute analysis (step S302). The color analysis processing means currently having the right to execute the analysis processing requests transmission of a command from the receiving memory distributing means 207, and the receiving memory distributing means 207 reads a top command in a part which is yet to be read and associated with the color analyzing means that has requested the command transmission (step S303). At this time, the color analysis processing means accumulates and holds a data amount of the read command.

In the data processing means 204, as shown in FIG. 6, the multithread controlling means 228 specifies the first color analysis processing means 229 and gives it the right to execute the analysis processing (step S331). The color analysis processing means that is endowed with the analysis processing execution right requests the intersystem communication means 211 for transmission of a command from the receiving memory distributing means 207 (step S332).

Again referring to FIG. 5, the intersystem communication means 211 judges on whether there is a request of command transmission from the data processing means 204 (step S304). If there is no request, the control repeats the step S304. If there is a request of command transmission from the data processing means 204, the intersystem communication means 211 requests the receiving memory distributing means 207 for command transmission, and the receiving memory distributing means 207 transmits from the receiving memory 206 through the intersystem communication means 211 a top command in a part which is yet to be read and corresponds to the color analyzing means that has requested for transmission of a command (step S305).

In this manner, the receiving memory distributing means 207 distributes the print data to the color analyzing means in the data processing means 203 and simultaneously distributes the print data to the data processing means 204 in the timing synchronized by the intersystem communication means 211. Different color information in the same print data is analyzed in different data processing means in the same timing.

Subsequently, the color analyzing means of the data processing means 203 makes a judgement upon whether the content of the transmitted command is not a line feed or an end of the print data (step S306). If it is not a line feed or an end of the print data, the color analysis processing means refers to the accumulated data amount of the command which was read after endowed with the execution right and make a judgment upon whether analysis of a predetermined amount of the print data, e.g., 1-Kbyte print data is completed (step S307). If analysis of a predetermined amount of data is yet to get through, the color analysis processing means analyzes the command (step S308), and the control returns to the step S303 where the next command is requested from the receiving memory distributing means 207 to be read. It is to be noted that, in the step S307, if analysis of a predetermined amount of the print data is accomplished, the color analysis processing means endowed with the right to execute the analysis processing informs the multithread controlling means 208 that analysis of a predetermined amount of the print data is finished. The multithread controlling means 208 judges on whether the color analysis processing means that has made notification is the last color analysis processing means (step S309). If it is not the last color analysis processing means, the multithread controlling means 208 rotates the right to execute the analysis processing to the next color analysis processing means in accordance with a predetermined color order (step S310), and the control returns to the step S303. The rotation order is previously determined with respect to the color analyzing means provided in the data processing means 203, and the execution right is rotated to the color analysis processing means 209 and the color analysis processing means 210 in the mentioned order. Further, the execution right is shifted from the last color analysis processing means 210 to the first color analysis processing means 209.

Additionally, in the step S206, if the content of the transmitted command represents a line feed or an end of the print data, the color analysis processing means currently endowed with the right to execute the analysis processing notifies the multithread controlling means 208 that analysis of the print data for the assigned color is completed, and the control jumps to the step S309 where the multithread controlling means 208 makes a judgment upon whether the color analysis processing means that has made notification is the last color analysis processing means (step S309).

If it is the last color analysis processing means in the step S309, a confirmation is made upon whether all the color analysis processing means provided in the data processing means 203 have informed that the content of the command was a line feed or an end of the print data, and a judgment is made upon whether the page data for one page is completed relative to all the colors assigned to the color analysis processing means in the data processing means 203 (step S311).

If the page data is not completed relative to all the colors of which the color analysis processing means in the data processing means 203 take charge, the right to execute the analysis processing is rotated to the next color analysis processing means in a predetermined color order (step S310), and the control returns to the step S303.

In the step S311, when it is decided that the page data is completed with respect to all the colors of which the color analysis processing means in the data processing means 203 take charge, the drawing means 214 makes a drawing based on the produced page data to generate the frame buffer data for each color component and stores the obtained results in the frame buffers 215 and 216, respectively (step S312).

In the data processing means 204, as shown in FIG. 6, the color analyzing means receives a command transmitted from the receiving memory distributing means 207 through the intersystem communication means 211 (step S333), accumulates the data amount of the read command, and makes a judgment upon whether the content of that command represents a line feed or an end of the print data (step S334). If it does indicates a line feed or an end of the data, the color analysis processing means refers to the accumulated data amount of the command read after endowed with the execution right and judges on whether analysis of a predetermined amount of the print data, e.g., 1Kbyte print data is completed (step S335). If analysis of a predetermined amount is yet to get through, the color analysis processing means analyzes the command (step S336), and the control returns to the step S332 where the next command is requested from the receiving memory distributing means 207 through the intersystem communication means 211.

It is to be noted that the color print data includes a color component setting command for defining the density of each color component for characters or figures to be printed and another command which defines shapes of characters or figures to be printed and does not contain color component information premising color components for characters or figures set by the color component setting command in this embodiment, too. In this embodiment, the color analysis processing means likewise identifies and holds the density level defined by the color component setting command relative to the color component to be analyzed when a read command is the color component setting command in the command analysis, and analyzes the command by making reference to the identified and held density level of the color component to be analyzed from the previously read color component setting commands when the current read command is a command including no color component information.

It is to be noted that, in the step S335, the color analysis processing means endowed with the right to execute the analysis processing informs the multithread controlling means 228 of completion of analysis of a predetermined amount of the print data when analysis of a predetermined amount of the print data is finished. The multithread controlling means 228 judges on whether the color analysis processing means that has made notification is the last color analysis processing means (step S337) and, if it is not the last color analysis processing means, the multithread controlling means 228 rotates the right to execute the analysis processing to the next color analysis processing means in accordance with a predetermined color order (step S338), thereby returning to the step S332. The order of rotation is determined in advance with respect to the color analyzing means provided in the data processing means 204, and the execution right is rotated to the color analysis processing means 229 and the color analysis processing means 230 in the mentioned order. Further, the execution right is shifted to the first color analysis processing means 229 after the last color analysis processing means 230.

In addition, when the content of a transmitted command indicates a line feed or an end of the print data in the step S334, the color analysis processing means endowed with the right to execute the analysis processing informs the multithread controlling means 228 of completion of analysis of the print data for the assigned color, and the control jumps to the step S337 where the multithread controlling means 228 judges on whether the color analysis processing means that has made notification is the last color analysis processing means (step S337).

If it is the last color analysis processing means in the step S337, check is made upon whether all the color analysis processing means provided in the data processing means 204 have informed that the content of the command indicates a line feed or an end of the print data, and a judgement is made upon whether the page data for one page is completed with respect to all the colors of which the color analysis processing means in the data processing means 204 take charge (step S339).

If the page data is not completed with respect to all the colors assigned to the color analysis processing means in the data processing means 204, the right to execute the analysis processing is rotated to the next color analysis processing means in accordance with a predetermined color order (step S338), and the control returns to the step S332.

In the step S339, when it is decided that the page data is completed for all the colors assigned to the color analysis processing means in the data processing means 204, the drawing means 234 depicts based on the generated page data and produces frame buffer data for each color component to be stored in the frame buffers 235 and 236, respectively (step S340). Here, the drawing means 234 in the data processing means 204 informs the drawing means 214 in the data processing means 203 through the intersystem communication means 211 of completion of the page data for all the colors assigned to the color analysis processing means in the data processing means 204.

Again referring to FIG. 5, the drawing means 214 in the data processing means 203 judges on whether completion of the page data for all the colors assigned to the color analysis processing means in the data processing means 204 has been notified by the drawing means 234 in the data processing means 204 via the intersystem communication means 211 after the step S312 (step S313) and, if the page data is not completed in the data processing means 204, the step S313 is repeated to wait for notification of completion. If completion in the data processing means 204 has been informed, it is decided that the frame buffer data is completed for four colors, and the frame buffer data corresponding to one page for two colors is transferred to the printing means 217. Then, an instruction to transfer the frame buffer data for two colors to the drawing means 234 in the data processing means 204 via the intersystem communication means 211 is given (step S314).

As shown in FIG. 6, the drawing means 234 in the data processing means 204 judges on whether the drawing means 214 in the data processing means 203 has given an instruction to transfer the frame buffer data through the intersystem communication means 211 after the step S339 (step S341) and, in case of no transfer direction, the step S341 is repeated to wait for the transfer instruction.

Upon receiving the transfer instruction, the drawing means 234 in the data processing means 204 transfers the created frame buffer data for one page from the frame buffers 235 and 236 to the printing means 217 through the intersystem communication means 211 (step S342).

The printing means 217 superimposes images for four colors to be printed based on the transferred frame buffer data for four colors. Then judge is made on whether analysis of all pages of the received print data is completed (step S315). That is, check is made up on whether all the color analysis processing means in the data processing means 203 have informed of the end of the print data and, if the end of the print data has been notified from the all the color analysis processing means, it is decided that analysis of all pages of the received print data is finished. In any other case, it is decided that it is not finished. If analysis of all pages is not completed, the content informed by the color analysis processing means is cleared and the control returns to the step S302. When it is decided that analysis of all the pages is accomplished, the processing is terminated.

In the data processing means 204, judge is similarly made on whether analysis of all the pages of the print data is completed (step S343). In other words, check is made up on reception of information indicating the end of the print data from all the color analysis processing means in the data processing means 204. If the end of the print data has been notified from all the color analysis processing means, it is decided that analysis of all the pages of the received print data is completed. In any other case, it decides that analysis is not completed. If analysis of all the pages is not completed, the content informed by the color analysis processing means is cleared and the control returns to the step S331. When it is decided that analysis of the all the pages is completed, the processing is terminated.

What is claimed is:

1. A color printing apparatus comprising:
   receiving means for receiving color print data having a plurality of color components;
   a plurality of color analysis processing means for respectively analyzing said color print data in connection with one of said color components;
   data distributing means for distributing said color print data to said color analysis processing means;
   analysis controlling means for giving an execution right to analyze said color print data to one of said color analysis processing means and shifting the execution right to a next color analysis processing means at a completion of an analysis of a predetermined amount of distributed color print data less than one page;
   drawing means for creating a plurality of drawing data respectively based on analysis results from said plurality of color analysis processing means;
   a plurality of frame buffers for respectively storing corresponding one of said plurality of drawing data; and
   printing means for printing color images based on said plurality of drawing data.

2. A color printing apparatus according to claim 1, wherein said analysis controlling means generates color analyzing means whose number is equal to that of said color components based on an predetermined information.

3. The color printing apparatus according to claim 2, wherein said predetermined information includes a number of said color components, a color component assigned to each color analysis processing means, said amount of data and a execution right shifting color order, and said analysis controlling means has setting means for setting a color component assigned to each color analysis processing means and said amount of data.

4. A color printing apparatus according to claim 1, further comprising a receiving memory for storing said print data received by said receiving means, said data distributing means managing in the receiving memory each top position of the print data to be distributed to a plurality of said color analysis processing means.

5. A color printing apparatus according to claim 1, wherein a plurality of said color analysis processing means sequentially read and analyze commands included in the color print data and notify said analysis controlling means that accumulation of a data amount of the read commands has reached said predetermined data amount when this occurred, said analysis controlling means shifting the execution right to the next color analysis processing means based on said notification.

6. A color printing apparatus according to claim 1, wherein a plurality of said color analysis processing means sequentially read and analyze commands included in the color print data and notify said analysis controlling means that the read command indicates start of a new page when it is true, said analysis controlling means shifting the execution right to the next color analysis processing means.

7. A color printing apparatus according to claim 1, wherein a plurality of said color analysis processing means sequentially read and analyze commands included in the color print data and, when the read command is a command indicative of an end of the color print data, a plurality of said color analysis processing means inform said analysis controlling means of this fact, said analysis controlling means shifting the execution right to the next color analysis processing means based on said notification.

8. A color printing apparatus according to claim 1, wherein said color print data includes a color component setting command and another command including no color component information premising color components set by said color component setting command, a plurality of said color analysis processing means sequentially reading and analyzing commands included in the color print data, detecting and holding a density level defined by said color component setting command with respect to a specified color component when a read command is the color component setting command, and referring to said density level to analyze a command including no color component information.

9. A color printing apparatus comprising:

receiving means for receiving color print data for an image having a plurality of color components;

a plurality of data processing means having at least one of color analysis processing means for analyzing said color print data in connection with one of said color components;

data distributing means for distributing said color print data to said color analysis processing means;

a plurality of analysis controlling means for giving an execution right to analyze said color print data to one of said color analysis processing means independently included in respective data processing means and shifting the execution right to a next color analysis processing means at a completion of an analysis of a predetermined data amount of color print data less than one page;

a plurality of drawing for creating at least one drawing data respectively based on analysis results by said color analysis processing means independently included in the respective data processing means;

a plurality of frame buffers for respectively storing corresponding one of said plurality of drawing data; and printing means for printing color images based on said plurality of drawing data.

10. A color printing apparatus according to claim 9, wherein a plurality of said analysis controlling means generate color analysis processing means whose number is equal to that of said color components in each data processing means based on predetermined information.

11. A color printing apparatus according to claim 9, wherein said predetermined information has a number of said color components, a color component assigned to each color analysis processing means included in each data processing means, said data amount and a execution right shifting color order, a plurality of said analysis controlling means including setting means for setting a color component assigned to each color analysis processing means and said data amount.

12. A color print data analyzing method comprising:

a plurality of color analyzing steps for analyzing color print data used for printing a color image by superimposing images for a plurality of color components in connection with one color component corresponding to each of a plurality of the color components; and an analysis color specifying step for specifying one of a plurality of said color analyzing steps to continuously analyze said color print data and rotating specification to the next color analyzing step in accordance with a predetermined color order upon continuous analysis of a predetermined data amount of color print data less than one page in the specified color analyzing step.

13. A color print data analyzing method according to claim 12, wherein said color analyzing step includes a step for sequentially reading a command included in said color print data to analyze that command and another step for detecting accumulation of a data amount of a command read in said color analyzing step, said analysis color specifying step rotating specification to the next color analyzing step when accumulation of said data amount reaches the predetermined data amount.

14. A color print data analyzing method according to claim 12, wherein said color analyzing step includes a step for sequentially reading a command included in said color print data to make a judgement upon whether the read command is a command indicative of start of a new page, said analysis color switching step rotating specification to the next color analyzing step in accordance with said predetermined color order when the read command is a command indicative of start of a new page.

15. A color print data analyzing method according to claim 12, wherein said color analysis analyzing step has a step for sequentially reading a command included in said color print data and making a judgment upon whether the read command is a command representing an end of said color print data, said analysis switching step rotating specification to the next color analyzing step in accordance with said predetermined order when the read command is a command indicative of start of a new page.

16. A color print data analyzing method according to claim 12, wherein said color print data includes a color component setting command and another command having no color component information premising a color component set by said color component setting command, a plurality of said color analyzing steps holding a density level defined by said color component setting command in connection with a color component to be analyzed when the read command is said color component setting command, and analyzing the read command by making reference to said density level when the read command is a command including no color component information.

17. A color print data analyzing method according to claim 12, further comprising a distributing step for holding positions of undistributed top commands in said color print data with respect to a plurality of said color analyzing steps respectively and for distributing said undistributed top commands to a plurality of said color analyzing step.

18. A color print data analyzing method, comprising:

a plurality of data processing steps having at least one of a plurality of color analyzing steps for analyzing color print data, which is used for printing a color image by superimposing images for a plurality of color components, in connection with one color component in accordance with a plurality of said color components; and a plurality of analysis color specifying steps for specifying one color analyzing step included in a plurality of said data processing steps to continuously analyze said color print data and for rotating specification to the next color analyzing step in accordance with a predetermined color order of the color analyzing steps included in each data processing step upon continuously analyzing a predetermined data amount of color print data less than one page in the specified color analyzing step.

* * * * *